No. 696,572. Patented Apr. 1, 1902.
C. J. C. & C. A. KRUMM.
TIME RECORDER.
(Application filed Aug. 30, 1900.)

(No Model.) 4 Sheets—Sheet 1.

No. 696,572. Patented Apr. 1, 1902.
C. J. C. & C. A. KRUMM.
TIME RECORDER.
(Application filed Aug. 30, 1900.)
(No Model.) 4 Sheets—Sheet 2.

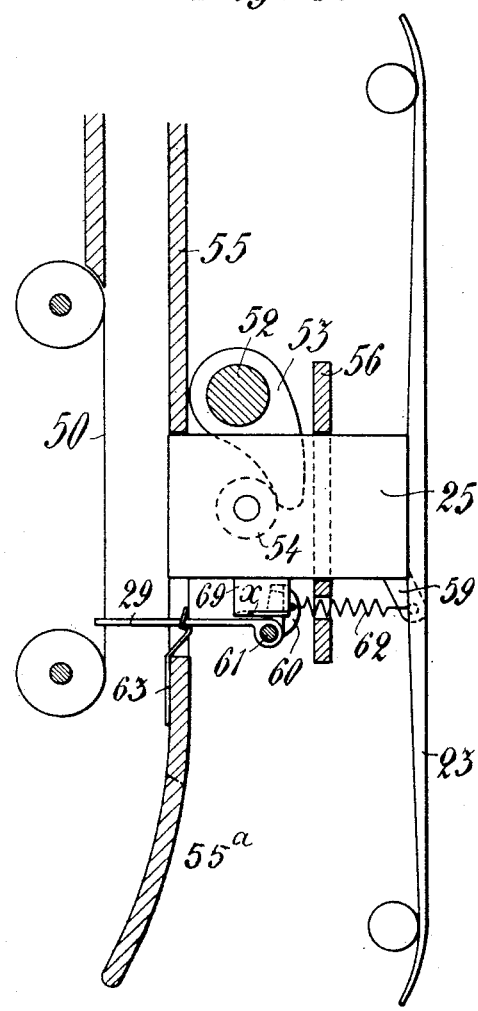
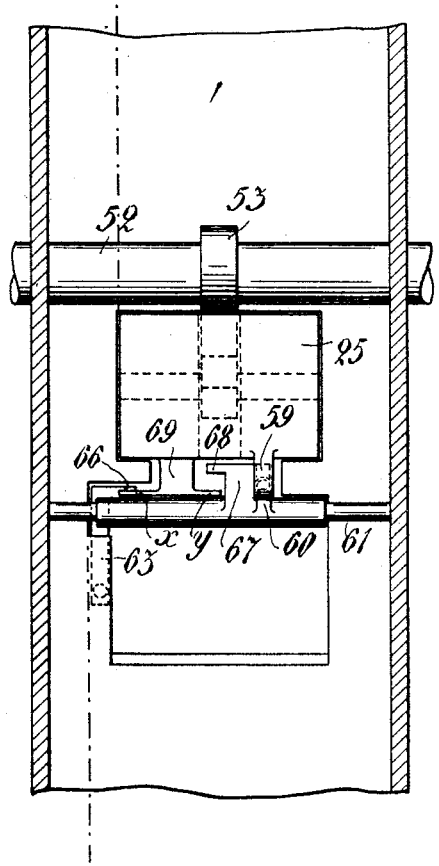

No. 696,572. Patented Apr. 1, 1902.
C. J. C. & C. A. KRUMM.
TIME RECORDER.
(Application filed Aug. 30, 1900.)
(No Model.) 4 Sheets—Sheet 4.

UNITED STATES PATENT OFFICE.

CAJUS JULIUS CASAR KRUMM AND CHRISTIAN ALEXANDER KRUMM, OF CHRISTIANIA, NORWAY.

TIME-RECORDER.

SPECIFICATION forming part of Letters Patent No. 696,572, dated April 1, 1902.

Application filed August 30, 1900. Serial No. 28,551. (No model.)

*To all whom it may concern:*

Be it known that we, CAJUS JULIUS CASAR KRUMM and CHRISTIAN ALEXANDER KRUMM, subjects of the King of Sweden and Norway, residing at Christiania, Norway, have invented certain new and useful Improvements in Time-Controlling Devices; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has relation to workman's time-recorders, and more particularly to that type of recorder adapted to be operated by the workman himself or some one acting for him.

The invention resides in certain improvements whereby the recording mechanism set in operation by the workman is greatly simplified, and consequently not as liable to become inoperative by more or less rough usage as would be the case with instruments of a more complex construction, and especially those designed to be handled by a person specifically appointed for the purpose; but that our invention may be fully understood we will describe the same in detail, reference being had to the accompanying drawings, in which—

Figure 1:
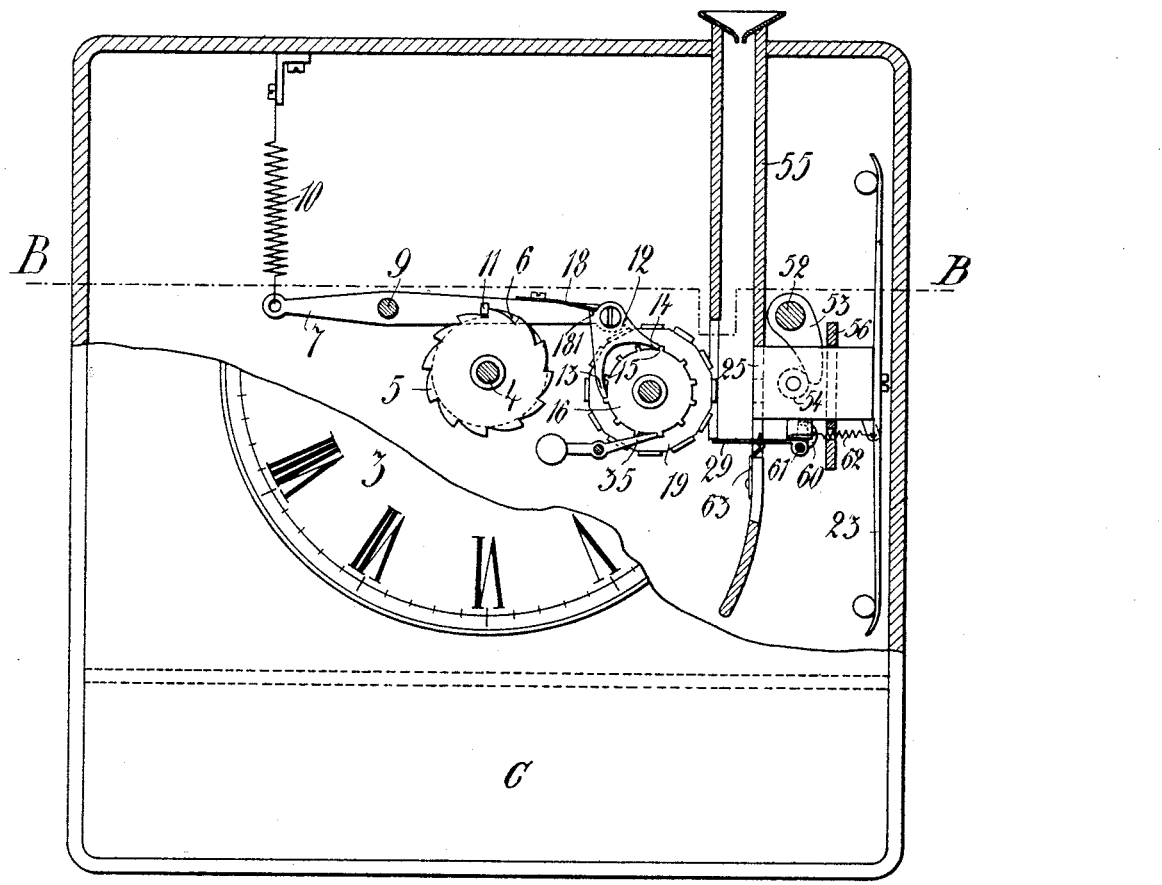
Figure 2:
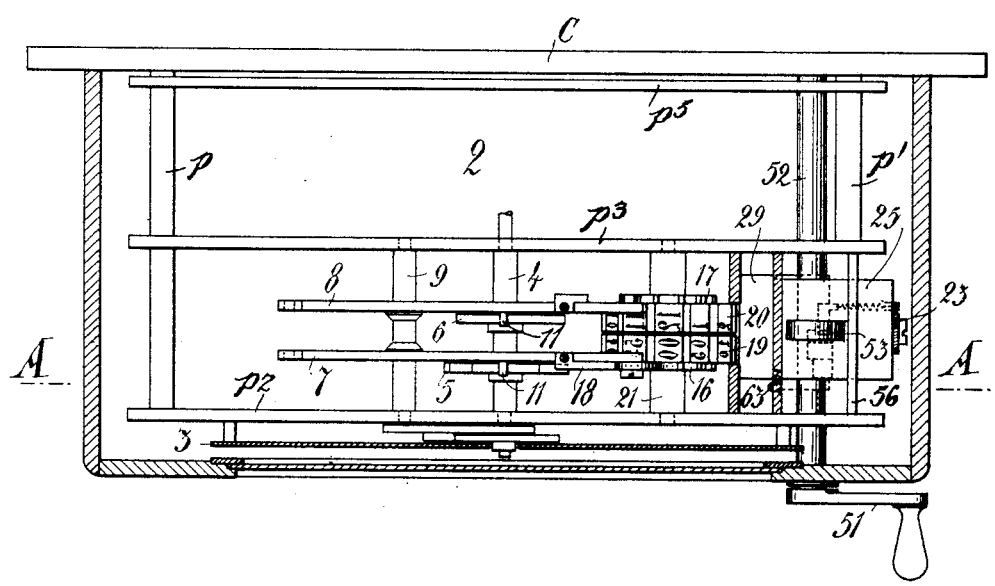
Figure 5:
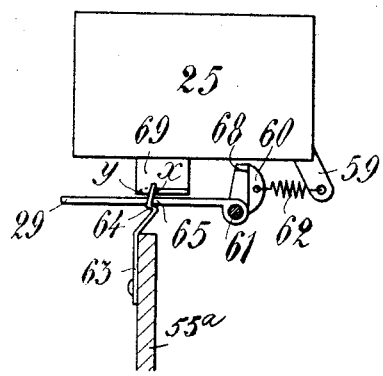
Figure 6:
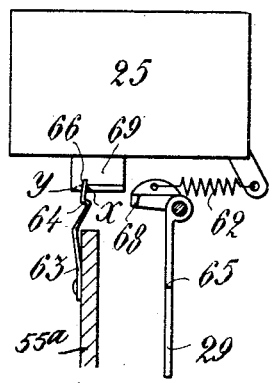
Figure 7:
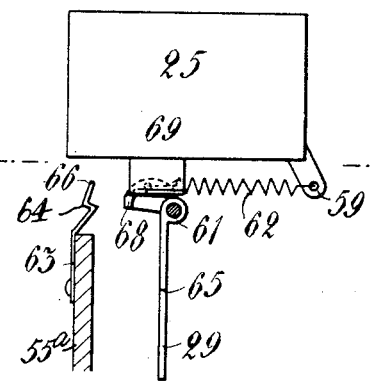
Figure 9:
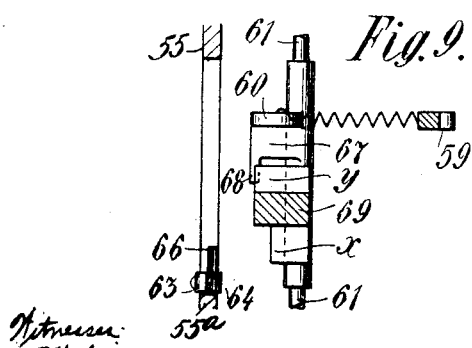
Figure 10:
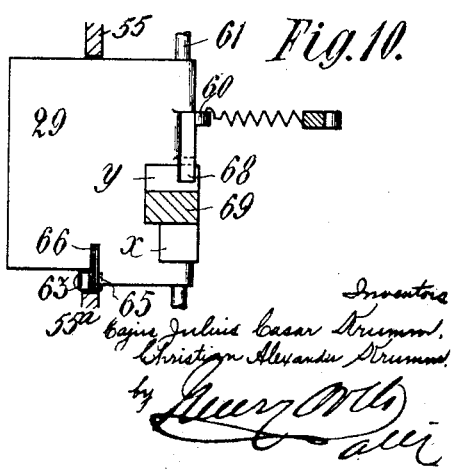

Figure 1 is an elevation, partly in section, with the front face broken away, of a workman's time-recorder embodying our improvements. Fig. 2 is a cross-section thereof on line A B of Fig. 1. Figs. 3 and 4 are fragmentary vertical, longitudinal, and transverse sections of the right-hand end of the instrument, illustrating the platen and slip or ticket support and mechanism connected therewith. Figs. 5 to 8 are fragmentary detail views, partly in section, of the platen slip or ticket support and connected mechanism, illustrating the same in various positions. Figs. 9 and 10 are sections on lines 9 9 and 10 10 of Figs. 7 and 8, respectively.

Referring more particularly to Figs. 1 and 2, C indicates the recorder-casing, having a clock-dial 3 in rear of a glazed opening in its front vertical face and adapted to contain in the rear part a clock mechanism of any desired kind, which we have deemed unnecessary to show, and near its right hand in front of the clock mechanism is arranged a chute 55 for the introduction and guidance to the time-recording appliances of a record ticket or slip which has, as usual, some indication or symbol identifying the workman depositing the same on coming to or going from his work. The right-hand wall of the chute is extended downward below the said time-recording appliances, as shown at 55$^a$, and curves to the left to guide the slip into the lower part of the casing C or into a receptacle therein, suitable means being provided for the removal of the slips or the receptacle containing the same by a person authorized to do so. The chute 55 has apertures in its left and right hand walls, in which work the time-recording appliances.

The hour-hand arbor 4 extends from the clock mechanism in the rear part of the casing to the front part thereof and carries, as usual, the clock-hands, also not shown.

As shown in Fig. 2, the spacing-pillar $p$ of the clock-frame is extended nearly to the front of the casing C and has secured thereto a frame-plate $p^2$, connected at the right hand with the front frame-plate $p^3$ of the clock mechanism and the spacing-pillar $p'$ by an apertured guide-partition 56, that serves as a guide for a platen 25, and between said frame-plates $p^2$ $p^3$ is arranged the ticket-chute 55, hereinabove referred to.

The hour-hand arbor 4 has bearing in the frame-plates $p^2$ $p^3$ and, as usual, in the rear clock-frame and has secured thereto two toothed wheels 5 and 6. On an arbor 9 are mounted two two-armed levers 7 and 8, each provided with a laterally-projecting pin or lug 11, held in perpetual contact with the periphery of their respective toothed wheels 5 and 6 by means of a spring 10, attached to the left-hand arm of each of said levers and to the top of the casing C, respectively, as shown in Fig. 1. To the right-hand end of each of the levers 7 8 is pivoted a two-armed pawl or anchor 12, whose pallets 13 and 14 straddle several teeth 15 of toothed wheels 16 and 17, respectively, which are held against backward rotation by weighted check-pawls 35. Each of the pawls 12 has a shoulder 181, on which bears the free end of a spring 18 in such a manner that when either lever 7 or 8 is lifted by a tooth on their respective toothed wheels 5 and 6 the pawl will be tilted to disengage its arm or pallet 14 from the tooth engaged thereby, while its pallet 13 will engage a tooth next to the one previously engaged thereby, and as the tooth that lifted the levers moves from under their lugs and the levers again drop onto the face of their wheels or between two teeth thereon, as the case may be, the pawl will rotate the toothed wheels 16 and 17 a predetermined distance. These two wheels 16 and 17 are secured to or formed integral with two time-recording or type wheels 19 and 20, respectively, the wheel 19 having numerals indicating five-minute periods, hence has twelve numerals "5," "10," "15," &c., to "60," while the wheel 20 has hour-numerals from "1" to "12." It follows from this arrangement of recording-wheels that the ratchet-toothed wheel 5 must have twelve teeth, while the wheel 6 has but one tooth, and that the pawls 12 and 13 operate in such a manner as to rotate the toothed wheel 16 and its recording-wheel 19 a distance equivalent to the space between two of the teeth of said wheel 16 every five minutes, while the wheel 17 will be similarly rotated once every hour, together with its recording-wheel 20.

We prefer to make use of perforating or indenting type on the recording-wheels 19 and 20; but, if desired, an inking-in ribbon 50 can be used, as shown in Fig. 3, which may be arranged and operated in the same manner as the inking-in ribbon of type-writers.

Figure 8:
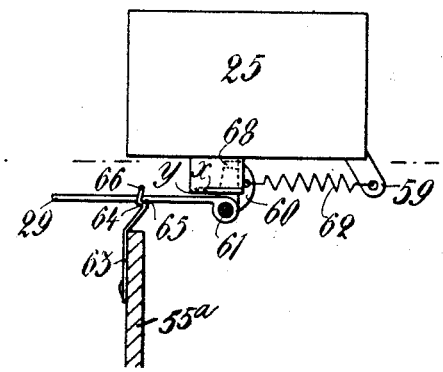

The record perforations or impressions are made by a platen 25, guided in an opening in the right-hand wall of the ticket-chute 55 and in the aforementioned apertured guide-partition 56, the platen being held in a normally-retracted position, Figs. 2, 3, and 8, by a leaf-spring 23 secured thereto, the free ends of said spring having bearing-on pins or studs secured to the casing. The platen 25 is actuated by the workman—that is to say, it is moved by him from its aforesaid normal position into contact with the recording-wheels—to which end we provide a spindle 52, revoluble in bearings in the front and rear walls of the casing C and carrying a cam 53, projecting into a slot or recess in the platen, in which is mounted a roller 54, held in contact with said cam by the platen-spring 23, said spindle 52 carrying a suitable crank-handle 51 at its forward end for rotating it. (See Fig. 2.)

With the platen 25 is connected a gate 29, which constitutes the bottom of the ticket-chute 55 when said platen is in its normal retracted position, the connection and the normal position of the gate being such as to support the record-slip in front of the type-face of the recording-wheels 19 and 20 and so as to drop as soon as a record is made on the slip to cause the latter to fall to the bottom of the casing C or into a receptacle therein. These connections between the gate 29 and platen 25 will now be described, reference being had more particularly to Figs. 3 to 10, which are drawn to an enlarged scale.

To the extension 55ª of the right-hand wall of the ticket-chute 55 and projecting into the opening therein in which the platen 25 reciprocates is secured a flat spring 63, having near its free end a shoulder or offset 64, adapted to engage a corresponding shoulder or offset 65 on the gate 29, as more clearly shown in Fig. 10, said spring 63 having at its free end a lateral projection 66, as more clearly shown in Figs. 9 and 10. The gate 29 is loosely mounted on a spindle 61, secured to the frame-plates $p^2 p^3$, and the hub or bearing-sleeve of said gate has a radial arm 67, provided with a lateral extension or lug 68 at its free end and with a perforated lug 60, connected by a spring 62 with a lug 59 at the rear or right-hand end of the platen 29.

To the under side of the platen 29 is secured a T-shaped block 69, the laterally-projecting arms $x$ and $y$ of which are of such length as to coöperate with the lateral projection 68 on radial arm 60 of gate 29 and with the lateral projection 66 at the free end of the spring 63. Of course it will be understood that the spindle 61 may be mounted in the frame-plates $p^2 p^3$ so as to revolve freely in its bearings, in which case the gate 29 is rigidly secured to said spindle.

The operation of the described mechanism is as follows: When the platen 25 is in its normal position, Figs. 3 and 8, the spring 62, that connects the gate 29 with the lug 59 on the platen, is under tension and holds said gate in a horizontal position, with its shoulder 65 on the offset or shoulder 63 and with the lateral projection or arm $y$ of the T-shaped block 69 on said platen on the left of the lateral projection 68 of radial arm 60 on gate 29, the latter closing the lower end of the chute 55. If the platen 29 is now thrown forward against the recording-wheels 19 and 20 to make a record on a slip supported by the gate in front of the type of said wheels by rotation of the cam-spindle 52 through the medium of the crank-handle 51, Fig. 5, the arm or projection $x$ on block 69 on the under side of the platen engages the lateral projection 66 at the free end of the spring 63, and thereby disengages the spring from the gate 29, and as its lifting-spring 62 is not now under tension, in view of the fact that the platen is moving from its normal into its operative position from right to left, its lug 59 moves toward the gate-spindle, and said gate is free to drop through a slot in extension 55ª of the right-hand wall of ticket-chute 55, this release of the gate 29 taking place after the platen has made the impression on the slip, so that the latter at once drops to the bottom of the casing or into a receptacle therein, the parts being now in the position shown in Fig. 6, the radial arm 68 on hub of gate 29 lying in a horizontal plane a little below the path of the lateral projection $y$ in block 69 of the platen. As soon as the platen-actuating spindle 52 is released, the platen-spring 23 being brought under tension by the described movement of the platen, the latter is drawn back into its normal position and places the gate-lifting spring again under tension. During this backward movement of the platen from position Fig. 6 to position Fig. 7 the arm $y$ on block 69 will ride over the lateral projection 68 on radial arm 67 of gate 29, thus preventing said gate from being turned into a horizontal position under the stress of its spring 62 until said arm $y$ has cleared said projection 68, at which time the platen will again have reached its normal position, Figs. 3 and 8, the gate 29 being thus free to rise along spring 63, its shoulder or offset 64 snapping under the offset or shoulder 65 on said flap, the parts being then again in their normal position, Figs. 3, 4, 8, and 9.

Having thus described our invention, what we claim as new therein, and desire to secure by Letters Patent, is—

1. The combination with a chute for the reception of a record-slip and means automatically positioning type adjacent to an opening in said chute; of a platen, hand-actuated appliances moving said platen from a normal position to the type across the chute, means automatically moving said platen back to normal position, a gate normally closing the delivery end of the chute and adapted to hold a record-slip in the path of the platen, a locking device for said gate, means on the platen acting on the locking device to release the gate and thereby open the chute, when a record-slip is being printed on, and means, operated by the platen when moving back to normal position, and operating to move the gate and lock it into its normal position, substantially as and for the purposes set forth.

2. The combination with a chute for the reception of a record-slip, and means automatically positioning type adjacent to an opening in said chute; of a platen, hand-operated appliances moving said platen from a normal position to the type, means automatically moving the platen back to normal position, a gate normally closing the delivery end of the chute and adapted to hold a record-slip in the path of the platen, a resilient support for said gate, means on the platen moving said support out of engagement with the platen when a record-slip is being printed on and thereby opening the delivery end of the chute, and means, operated by said platen when moving back to normal position, to move the gate back into engagement with its support and thereby again close the delivery end of the chute, substantially as and for the purposes set forth.

3. The combination with a chute for the reception of a record-slip, and means automatically positioning type adjacent to an opening in said chute; of a platen, hand-operated appliances moving said platen from a normal position to the type, means automatically moving the platen back to normal position, a gravity-gate normally closing the delivery end of the chute and adapted to hold a record-slip in the path of the platen, a locking device for said gate, means on the platen acting on the locking device to release the gate and thereby cause it to swing out of the chute, when a record-slip is being printed on, and a spring connection between the gate and platen operating to move said gate back into the chute and into engagement with the locking device when said platen is moving back to normal position, substantially as and for the purpose set forth.

4. The combination with a chute for the reception of a record-slip and means automatically positioning type adjacent to an opening in said chute; of a polygonal or block-like platen slidable in ways, hand-operated appliances moving said platen from a normal position to the type, means automatically moving the platen back to normal position, a gravity-gate normally closing the delivery end of the chute and adapted to hold a record-slip in the path of the platen, a locking device for said gate, means on the platen acting on the locking device to release the gate and thereby cause it to swing out of the chute, when a record-slip is being printed on, and a spring connection between the gate and platen operating to move said gate back into the chute and into engagement with the locking device when said platen is moving back to normal position, substantially as and for the purpose set forth.

5. The combination with the type-wheels 19 and 20, the toothed wheels 16 and 17 respectively secured to wheels 19 and 20, the toothed wheels 5 and 6 and the spring-controlled levers 7 and 8, each carrying a spring-actuated pawl 12 engaging wheels 16 and 17 respectively; of an open-ended chute into a slot of which the aforesaid type-wheels project, a platen having motion to and from said type-wheels across the chute, and a gate for the latter under the control of the platen and operating to close and open the passage through the chute below the type-wheels, for the purpose set forth.

6. The combination with the type-wheels 19 and 20, the chute 55 into an aperture of which said wheels project, said chute having its opposite apertured wall extended below said type-wheels and the spring 63 having offset 64 and lateral projection 66 secured to said extended wall and projecting into the aperture thereof, the platen 25 having block 69 on its under side provided with lateral projections $x$, $y$, and means for moving said platen to and from the type-wheels; of the swinging gate 29 connected by spring with the rear end of the platen and having on its hub a radial arm 67$^a$ provided with a lateral projection 68, said parts constructed and operating substantially as and for the purpose set forth.

In witness whereof we have hereunto set our hands in presence of two witnesses.

CAJUS JULIUS CASAR KRUMM.
CHRISTIAN ALEXANDER KRUMM.

Witnesses:
AUG. OLSEN,
M. ALGER.